(12) United States Patent
Esseling

(10) Patent No.: US 8,588,760 B2
(45) Date of Patent: Nov. 19, 2013

(54) PUSH-TO-TALK PSTN BACK-TO-BACK USER AGENT FOR CONNECTING A PTT SYSTEM TO THE PSTN/ISDN WORLD

(75) Inventor: Norbert Esseling, Bonn (DE)

(73) Assignee: T-Mobile International AG, Bonn (DE)

( * ) Notice: Subject to any disclaimer, the term of this patent is extended or adjusted under 35 U.S.C. 154(b) by 858 days.

(21) Appl. No.: 12/307,762

(22) PCT Filed: Jun. 26, 2007

(86) PCT No.: PCT/EP2007/005629
§ 371 (c)(1),
(2), (4) Date: Aug. 24, 2009

(87) PCT Pub. No.: WO2008/006461
PCT Pub. Date: Jan. 17, 2008

(65) Prior Publication Data
US 2010/0173624 A1 Jul. 8, 2010

(30) Foreign Application Priority Data
Jul. 8, 2006 (DE) .......................... 10 2006 031 701

(51) Int. Cl.
H04W 4/00 (2009.01)
H04M 3/42 (2006.01)
H04B 7/00 (2006.01)
H04L 12/16 (2006.01)
H04Q 11/00 (2006.01)

(52) U.S. Cl.
USPC ............ 455/422.1; 455/518; 455/414.1; 370/260

(58) Field of Classification Search
USPC ............... 455/422.1, 516–520, 414.1, 426.1, 455/414.4
See application file for complete search history.

(56) References Cited

U.S. PATENT DOCUMENTS

| 7,860,524 | B2* | 12/2010 | Laible et al. ................. 455/518 |
| 7,983,199 | B1* | 7/2011 | Nguyen et al. .............. 370/260 |
| 2003/0224825 | A1 | 12/2003 | Cox et al. |
| 2004/0010548 | A1* | 1/2004 | Hamilton et al. ........... 709/204 |
| 2004/0249949 | A1* | 12/2004 | Gourraud et al. .......... 709/227 |
| 2006/0046697 | A1 | 3/2006 | Koren et al. |
| 2006/0052126 | A1* | 3/2006 | Choksi ........................ 455/518 |
| 2006/0105792 | A1* | 5/2006 | Armbruster et al. ........ 455/517 |
| 2006/0178138 | A1 | 8/2006 | Ostroff et al. |
| 2006/0178161 | A1* | 8/2006 | Jung ........................... 455/518 |

(Continued)

FOREIGN PATENT DOCUMENTS

DE 10 2005 014 519 10/2006
EP 1 703 712 9/2006

(Continued)

OTHER PUBLICATIONS

Search Report dated Jan. 31, 2007 in corresponding German Application No. 10 2006 031 701.7.

(Continued)

Primary Examiner — Kent Chang
Assistant Examiner — Nathan Brittingham
(74) Attorney, Agent, or Firm — Faegre Baker Daniels LLP

(57) ABSTRACT

A method for carrying out a Push-to-Talk communication in a digital and/or analog telephone network, including an interface for a semi-duplex communication between a Push-to-Talk server and the analog or digital telephone network and the analog or digital network. The interface uses a communication node or group system as computer and carries out a communication in a transmission channel with automatic directional switching in an analog or digital telephone network in the direction of an available Push-to-Talk server, the analog or digital telephone network being designed as an audio and control interface in the direction of the operating means.

17 Claims, 1 Drawing Sheet

(56) References Cited

U.S. PATENT DOCUMENTS

2008/0305751 A1    12/2008  Naumann
2009/0252084 A1*  10/2009  Fodor et al. .................. 370/328

FOREIGN PATENT DOCUMENTS

| GB | 2 404 117 | | 1/2005 |
|---|---|---|---|
| GB | 2404117 A | * | 1/2005 |
| WO | 97/28658 | | 8/1997 |
| WO | 2005/006650 | | 1/2005 |
| WO | 2005/066550 | | 1/2005 |
| WO | 2006/105275 | | 10/2006 |

OTHER PUBLICATIONS

Search Report dated Sep. 28, 2010 in corresponding German Application No. DE 10 2006 031 701.7.

* cited by examiner

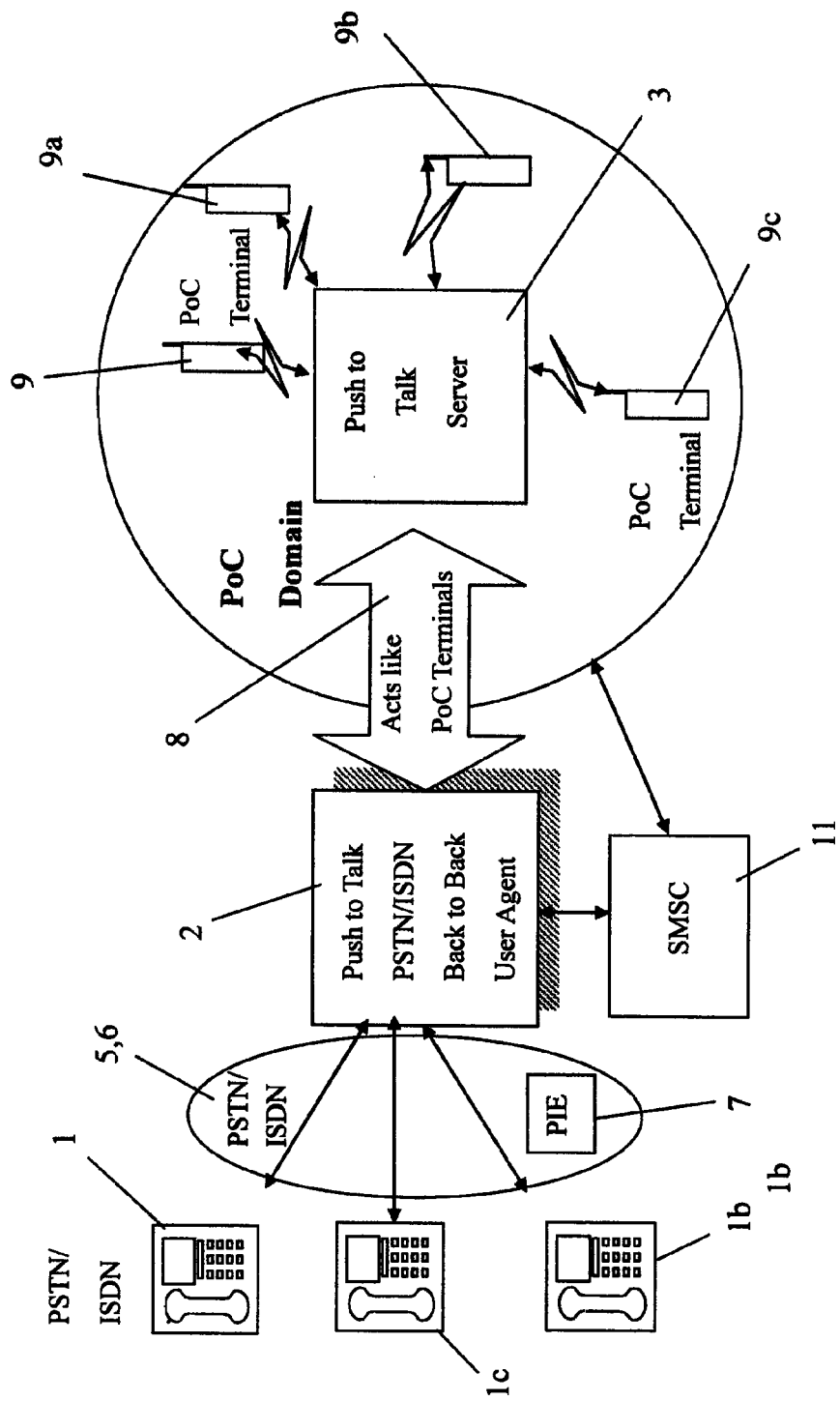

PUSH-TO-TALK PSTN BACK-TO-BACK USER AGENT FOR CONNECTING A PTT SYSTEM TO THE PSTN/ISDN WORLD

CROSS-REFERENCE TO RELATED APPLICATION

This application is related to and claims the benefit under 35 U.S.C. §119 and 35 U.S.C. §365 of International Application No. PCT/EP2007/005629, filed Jun. 26, 2007.

The invention relates to a method for the communication of incoming and outgoing calls in an analog and/or digital telephone network, wherein the communication is executed by means of a user agent (UA) to a push-to-talk-service (PTT service) and is designed as an interface for an alternating transmission direction in a transmission channel with automatic direction switching for the active participants (Semi duplex method) between the push-to-talk user agent and the analog and/or digital telephone network, wherein the analog and/or digital network serves as an interface to the user agent (UA), which supports the push-to-talk functions.

Up to now push-to-talk (PTT) has been known as a service for mobile packet networks, such as for example for the GSM or UMTS network, in which case special terminals are necessary.

Such a service is in similar fashion known as a voice radio communications service with "walkie-talkie" terminals.

The necessary special terminals for such a push-to-talk-service in most cases have a push-to-talk button, which communicates corresponding voice messages and/or voice information to the participating persons by pushing.

Push-to-talk services are preferably used for the purpose of communicating voice information rapidly and directly to persons.

Such push-to-talk services make possible a continuous contact between at least two communications participants over hundreds of kilometers via the mobile packet network GSM or UMTS.

In addition to this in the case of such services a direct communication of an entire group of persons with any number of participants is realizable.

The push-to-talk services known from the prior art have up to now been using digital packet communications networks or the GSM or the UMTS network for push-to-talk communication in this environment.

One significant advantage of the invention is the fact that a simple combination of existing packet-based push-to-talk systems with analog/digital/ISDN telephone connections is realizable, in which case standard telephones can be used.

Such group communication of analog (PSTN) or digital (ISDN) telephones has been realized up to now by telephone conferences.

Hence up to now these two communication types have been separately realizable side by side once as push-to-talk service in the GSM or UMTS network and as a telephone conference in the analog or digital telephone network.

The invention has therefore set itself the task of further developing a push-to-talk service in such a way that this service is realizable with simple and cost-effective terminals in combination of a GSM/UMTS network in connection with an analog and/or digital telephone network.

The solution of the problem is characterized by the features of the independent claims.

The significant feature of the invention is the fact that the interface uses a communications node and/or group system as a computer and executes a communication in a transmission channel with automatic direction switching in an analog or digital telephone network in the direction of an available push-to-talk server, wherein the analog or digital telephone network is designed as an audio and control interface in the direction of the operating means.

This inventive solution exhibits the significant advantage that now a push-to-talk service is realizable in simple fashion in an analog or digital telephone network, wherein the operating means used for this purpose are mobile telephones, such as cell phones or standard telephones in the analog telephone network, with or without the support of the dual tone multi-frequency method (DTMF).

For the carrying out of such a method with an inventive device, which executes a push-to-talk service in accordance with this method, a user of analog or digital telephone networks (PSTN/ISDN) is connected to the push-to-talk user agent (PTT-UA).

This PTT-UA automatically establishes a connection to an available push-to-talk server (PTT server).

In addition the PTT-UA is connected to a message service, such as the "short message service center" (SMSC) for example.

In the following the invention will be explained more closely with the help of a drawing representing only one embodiment. In this connection additional inventive features and advantages of the invention arise from the drawing and description.

The FIGURE shows the following:

FIG. 1: shows a schematic structure of an inventive push-to-talk method with the associated devices The method represented in FIG. 1 for the carrying out of a push-to-talk method with the corresponding devices, which execute a push-to-talk service in accordance with this method, shows that a user of analog or digital telephone networks (PSTN/ISDN) 6, 5 is connected to a push-to-talk user agent (PTT-UA) 2 by means of corresponding push-to-talk capable terminals 1, 1*c*, 1*b*.

This PTT-UA 2 automatically establishes a connection to an available push-to-talk server (PTT server).

In addition the PTT-UA 2 is connected to a message service, such as the "short message service center" (SMSC) 11 for example.

Various functions are required for the carrying out of a push-to-talk service, said functions partially being used as configuration functions or being freely selectable as operation functions for an operator of such a PTT-UA 2.

User Access Data

The PTT-user agent 2 stores all log-on and user-relevant data which are necessary for communication with the PTT server 3 in the name of the PSTN/ISDN device (PIE) 7. Each PTT user has his own, personal account.

Logging on to the Service

The logon is necessary for the authentication of the user for the purpose of the receiving of the access authorization to the PTT service and to its account data. The logon is carried out by a calling party address 14 of the calling user with a user name, as is the case with a password mechanism via a dual tone method (DTMF) 11 or voice controlled menu mode (interactive voice response) 12 or by means of pure voice recognition.

The logon is forwarded to the PTT server 3 in the necessary format of a PTT terminal 1, 1*a*, 1*b*.

Additional authentication procedures of the PTT solution, for example such as transmission of the reliable user information to the authentication service, are carried out.

Logon to the Groups

The PTT communication can be organized in groups or as one-to-one communication.

For group communication the PTT user agent 2 connects the audio path of the PIE 7 to the group of users, who are assigned to the PIE 7.

Hence the user is identified during the logon.

Push-to-Talk Floor Control (PTT-FC) 4

The PTT-UA 2 can administer different rules for participants of the PIT conversation.

In particular there is the floor control function, which controls the collision of a conversation burst direction of the PTT server 3 and thereby avoids it.

Such a function is also known from a uni-directional communication.

To send a conversation burst to the detection of the function of the PIE 7, via DTMF 11 or voice recognition/voice activation recognition/sound recognition/sound level recognition.

Storage and Notification

In case the PIE 7 is not connected to the PTT-UA, but a running connection exists for this user, the PTT-UA can store the conversation burst, call the PIE and deliver the conversation burst.

If the call is deleted by the PIE 7, the user can decide whether he would like to be notified. He can decide whether or not to remain in the group of the PTT server 3.

If the user does not wish to remain in the group, said user logs off from the group and/or from the service of the PTT server 3.

Menu and Settings

The PTT user agent 2 supports a menu for the setting of all parameters which are supported on the PTT server 3 by the PTT terminal 1, 1a, 1b.

Said menu includes:

Definition and Operation Groups (create/edit/delete/accept)

Setting of user preferences

Handling of notifications

Configuration of the service

These functions for the setting of parameters are however not restricted to such menu items.

The operation takes place via an IVR system (interactive voice response) 12 or via direct commands, which are controlled either via DTMF 11 or voice recognition commands.

Addressing of Users/Groups

The addressing of users is supported and essentially simplified by the PTT-UA 2. It is possible to address the groups either by means of voice recognition, such as for example the speaking of whole words or the speaking of individual letters in sequence.

In addition an addressing via DTMF 11 by the use of SMS similar input, such as for example addressing the numeric key 9 three times for "y" or with a text completion algorithm, such as for example "T9".

One-to-One Communication

Within a PTT communication a semi-duplex (automatic switching of the transmission direction in a transmission channel) 18 can establish a "one-to-one" communication.

In addition communication can likewise be established using an escape code 16, such as for example "0" or by direct addressing of the partner by speed dialing or by addressing of the name.

One-to-One/Group Communication; Connection Setup (Call)

The PIE 7 can set up and receive a push-to-talk group call, for example such as calling the entire group.

The addressing of users for a group call is supported and simplified by the PTT-UA 2.

In this connection it is possible to address the group identities or those of the users either by means of voice recognition (whole words or one letter after the other/speed dialing/names) or via DTMF 11 by SMS similar input, for example such as addressing the numeric key 9 three times for "y" or with a text completion algorithm, such as for example "T9" for whole words or individual letters in sequence/speed dialing/names.

Special Services

Special services such as Call Forwarding, Conference Calls, Call Waiting, Call Transfer, Call Hold can be used on the PSTN/ISDN 6, 5 side either on the caller's part or to terminate.

All of these services can also be used in a PTT call/connection.

Conference Calls

In addition to PTT functionality the PTT-UA provides a Conference Call which makes it possible for the PIE 7, or other users of PSTN/ISDN/PLMN fixed networks 6, 5, 17 and users of a PTT server groups to be part of a conference.

The conference can be seen as individual users to the PIT server if a bidirectional communication is used in the conference In addition the PTT-UA 2 can use another floor control mechanism as an alternative (e.g. collision handling of conversation bursts).

Invitation to Groups

Groups created in the PTT-UA 2 can be announced via all channels which are available on the PTT server 3.

In addition these groups can be announced via a GSM short message service or via other means. The PTT users can send an SMS to the PTT-UA 2 in order to invite the PIE users.

Web Configuration of the PTT-UA 2

All user configurations can be administered via a Web portal which is connected to the PTT-UA 2 or is implemented in it.

Handling of the Billing

Since the PTT-UA handles all user interactions, it can be used as a central point for the generation of Billing-Tickets/Events for all possible user interaction events. Another possibility is leaving the Billing in the PPT server 3.

Reference Symbols/Legend

1. PTT Push-to-talk terminal 1a, 1b, 1c
2. PTT-UA Push-to-talk PSTN/ISDN back-to-back user agent
3. PTT server Push-to-talk server
4. PTT-FC Push-to-talk floor control (collision control)
5. ISDN Integrated services digital network
6. PSTN Public switched telephone network
7. PIE PSTN/ISDN—facility
8. PoC Push-to-talk over cellular
9. PoC Terminal Terminal for Push-to-talk over cellular 9a, 9b, 9c
10. SMS Short message service
11. SMSC Short message service center
11. DTMF Dual tone multi frequency
12. IVR Interactive voice response (voice-controlled menu mode)

13. Calling Party Conversation partner
14. Calling Party Address of the source terminal
15. Burst Data packet in the exchange between telephone and Radio base station (BTS)
16. Escape Code
17. PLMN Public land mobile network
18. Semi-Duplex
   Communication Communication with automatic direction switching of the transmission direction in the transmission channel

The invention claimed is:

1. A method for carrying out a push-to-talk communication, comprising:
   providing a digital and/or analog telephone network PSTN/ISDN having PSTN/ISDN push-to-talk terminals;
   providing a push-to-talk (PTT) server that is network connected to one or more push-to-talk terminals in a push-to-talk cellular domain;
   providing a push-to-talk (PTT) user agent interface communication between the PSTN/ISDN network and one or more of the terminals therein and the PTT server in a transmission channel with semi-duplex automatic direction switching between the PSTN/ISDN network and the PTT server, the PTT user agent automatically establishing a connection to the PTT server;
   the PTT user agent is connected to a short message service (SMS);
   the PSTN/ISDN network having a PSTN/ISDN facility (PIE) providing audio and control interfacings in a direction toward the PTT user agent, the PSTN/ISDN facility PIE supporting DTMF signaling and/or interactive speech output and/or voice recognition;
   wherein various functions are required for the carrying out of a push-to-talk service, said functions partially being used as configuration functions or being freely selectable as operation functions for an operator of the PTT user agent;
   wherein the PTT user agent stores user access data that is all logon and user-relevant data which are necessary for communication with the PTT server in the name of the PSTN/ISDN facility PIE, wherein each PTT user has his own personal account;
   wherein the logon to the PTT service is necessary for the authentication of the user for the purpose of the receiving of access authorization to the PTT service and to its account data;
   wherein the PTT communication is organized in groups or as one-to-one communication, and for group communication the PTT user agent connects the audio path of the PIE to the group of users which are assigned to the PIE;
   wherein the PTT user agent administers different rules for participants of a PTT conversation, including a floor control function, which controls the collision of a conversation burst direction of the PTT server;
   wherein in case the PIE is not connected to the PTT user agent, but a running connection exists for this user, the PTT user agent stores the conversation burst, calls the PIE and delivers the conversation burst;
   wherein addressing of users is carried out by means of voice recognition or via dual tone method DTMF input;
   wherein groups created in the PTT user agent can be announced via all channels which are available on the PTT server and in addition via a GSM short message service, wherein a PTT user can send an SMS to the PTT user agent in order to invite the PIE users; and
   providing, by means of a menu available to the PSTN/ISDN terminals, all parameters which are supported on the PTT server which can he set by the PSTN/ISDN terminals, said menu including:
   creating/editing/deleting/accepting group definitions and their administration,
   setting of user preferences,
   management of notifications,
   configuration of the PTT server;
   wherein the PTT user agent functions as a central point for the generation of billing and tickets/events for possible user interaction events and for announcement via communication channels or the short message service (SMS) of groups created in the PTT user agent.

2. The method according to claim 1, wherein the user agent holds relevant data which are necessary for communication in order to communicate with the PTT server in the name of a PSTN/ISDN user.

3. The method according to claim 1, wherein each user is authenticated and authorized by: a Calling/Called Party address and/or a user name/password by means of DTMF IVR and/or by means of voice recognition.

4. The method according to claim 3, wherein the authentication is forwarded to the push-to-talk server and translated.

5. The method according to claim 1, wherein the floor control function, prevents said collisions when the communication is carried out as uni-directional communication.

6. The method according to claim 5, wherein in the case where the PIE is not connected to the user agent but there is a connection to a PSTN/ISDN user, the PTT user agent stores the conversation burst, calls the PSTN/ISDN user, delivers the conversation burst, and wherein the user agent then deletes the burst, calls the PIE and connects the PIE to the group.

7. The method according to claim 1, wherein the PSTN/ISDN user decides when a call from the PSTN/ISDN user is ended, whether and when a notification for the user is developed and whether the user remains in the groups of the push-to-talk server or logs off from the groups and/or the services of the push-to-talk server.

8. The method according to claim 1, which takes place by means of an interactive voice input or output system or via direct voice commands, which are controlled by means of DTMF or voice recognition commands.

9. The method according to claim 1, wherein the push-to-talk communication is structured as a semi-duplex, "one-to-one" communication via voice recognition or DTMF by means of an escape code or by means of direct addressing of a partner to the communication by speed dialing or by addressing of the partner name.

10. The method according to claim 1, wherein the PSTN/ISDN user can set up and receive a push-to-talk group call.

11. The method according to claim 1, wherein special services including one or more of Call Forwarding, Conference Calls, Call Waiting, Call Transfer, or Call Hold are used on the PSTN/ISDN network side either on the caller's part or to terminate, or in push-to-talk conversations/connections.

12. The method according to claim 1, wherein in addition to push-to-talk functionalities the PTT user agent develops conference calling, which includes push-to-talk users in the PSTN/ISDN network, other users of PSTN/ISDN/PLMN fixed networks and/or users of a PTT server group.

13. The method according to claim 1, wherein a conference is developed as an individual user to the PTT server if a bidirectional communication is used in the conference, or the push-to-talk user agent uses other floor control mechanisms.

14. The method according to claim 1, wherein all user configurations are administrated via a Web portal which is connected to the push-to-talk user agent or is implemented in the push-to-talk user agent.

15. The method according to claim 1, wherein the PTT user agent tracks all user actions and is used as a central point for the generation of Billing/Tickets/Events for all possible user interaction events.

16. The method according to claim 1, wherein billing is developed in the PTT server.

17. The method according to claim 1, wherein additional functionalities are integrated for the provision of additional security functions.

\* \* \* \* \*

UNITED STATES PATENT AND TRADEMARK OFFICE
CERTIFICATE OF CORRECTION

| | | |
|---|---|---|
| PATENT NO. | : 8,588,760 B2 | Page 1 of 1 |
| APPLICATION NO. | : 12/307762 | |
| DATED | : November 19, 2013 | |
| INVENTOR(S) | : Norbert Esseling | |

It is certified that error appears in the above-identified patent and that said Letters Patent is hereby corrected as shown below:

In the Claims

Claim 1, Column 6, Line 3, delete "he" and insert --be--

Claim 5, Column 6, Line 27, after "function" delete ","

Signed and Sealed this
Eleventh Day of February, 2014

Michelle K. Lee
*Deputy Director of the United States Patent and Trademark Office*